US009399915B2

(12) United States Patent
Hoffmann et al.

(10) Patent No.: US 9,399,915 B2
(45) Date of Patent: Jul. 26, 2016

(54) DUMPING SYSTEM

(71) Applicant: TAKRAF GmbH, Leipzig (DE)

(72) Inventors: Dieter Hoffmann, Leipzig (DE); Martin Kressner, Klipphausen OT Ullendorf (DE)

(73) Assignee: TAKRAF GmbH, Leipzig (DE)

( * ) Notice: Subject to any disclaimer, the term of this patent is extended or adjusted under 35 U.S.C. 154(b) by 0 days.

(21) Appl. No.: 14/546,530

(22) Filed: Nov. 18, 2014

(65) Prior Publication Data

US 2015/0136566 A1 May 21, 2015

(30) Foreign Application Priority Data

Nov. 19, 2013 (DE) .................. 10 2013 223 536

(51) Int. Cl.
| | |
|---|---|
| *B65G 15/08* | (2006.01) |
| *E21C 41/32* | (2006.01) |
| *B65G 15/28* | (2006.01) |
| *B65G 15/60* | (2006.01) |
| *B65G 21/10* | (2006.01) |
| *B65G 21/04* | (2006.01) |
| *B65G 65/28* | (2006.01) |

(52) U.S. Cl.
CPC .............. *E21C 41/32* (2013.01); *B65G 15/28* (2013.01); *B65G 15/60* (2013.01); *B65G 21/04* (2013.01); *B65G 21/10* (2013.01); *B65G 65/28* (2013.01)

(58) Field of Classification Search
CPC ........ B65G 15/08; B65G 39/12; B65G 39/20; B65G 15/40; B65G 47/71; B65G 47/5131
USPC .................. 198/617, 354, 820–830
See application file for complete search history.

(56) References Cited

U.S. PATENT DOCUMENTS

| | | | | |
|---|---|---|---|---|
| 3,643,792 A * | 2/1972 | Resener | .............. | B65G 17/066 |
| | | | | 198/834 |
| 4,261,460 A * | 4/1981 | Peterson, II | ................... | 198/828 |
| 4,440,293 A * | 4/1984 | Allan et al. | .................... | 198/813 |
| 5,762,179 A * | 6/1998 | Oury et al. | ................. | 198/861.1 |
| 6,039,170 A * | 3/2000 | Clark | ............................. | 198/364 |
| 6,811,023 B1 * | 11/2004 | Christiana | ............. | B65G 17/10 |
| | | | | 198/818 |
| 8,177,055 B2 * | 5/2012 | Zamorano | ..................... | 198/828 |
| 2011/0132719 A1 * | 6/2011 | Tebbe et al. | ................... | 198/301 |

FOREIGN PATENT DOCUMENTS

| | | |
|---|---|---|
| DE | 667 084 C | 11/1938 |
| DE | 686 675 C | 1/1940 |
| DE | 19 33 619 U | 3/1966 |
| DE | 88 279 A | 11/1972 |

* cited by examiner

*Primary Examiner* — James R Bidwell
(74) *Attorney, Agent, or Firm* — McGlew and Tuttle, P.C.

(57) ABSTRACT

A dumping system, for the dumping of material, in particular for the filling of a former strip mine, includes a conveyor belt with belt modules (7) suspended on cables and a traveling tripper (15), which is arranged traveling in the direction of conveying. The belt modules (7) are fastened by braced carrier cables (3) and suspension cables (5) fastened thereto in a mostly horizontal alignment. The traveling tripper (5) can travel on the belt modules (7). Furthermore, the slack of the carrier cables (3) may be compensated by a different length of the suspension cables (5), such that the belt modules (7) are aligned mostly horizontally. It is thus possible to span over the area to be dumped (for example, a pit) with cables and to dump material by the traveling tripper at all points of the bracing. Thus, it is not necessary to drive the dumped material.

21 Claims, 6 Drawing Sheets

DUMPING SYSTEM

CROSS REFERENCE TO RELATED APPLICATIONS

This application claims the benefit of priority under 35 U.S.C. §119 of German Patent DE 10 2013 223 536.4 filed Nov. 19, 2013, the entire contents of which are incorporated herein by reference.

FIELD OF THE INVENTION

The present invention pertains to a dumping system for the dumping of material, and in particular for the filling of a former strip mine.

BACKGROUND OF THE INVENTION

Prior-art systems for the dumping of material in strip mines consist of a combination of a dumping belt, a traveling tripper and a stacker on crawlers.

The system lies on the dumped material and is moved forwards on same. In this case, the stacker is always close to the slope edge. This is possible as long as the dumped material generates a stable slope. In the case of unstable material, the heavy stack on the slope edge is, in particular, at risk. For the most part, the stability is improved by means of a specific dumping at the bottom of the slope. However, this requires a stacker with a long stacker boom. Nevertheless, if the slope is not stable, then the material has to be drained before dumping, which has the drawback of causing a great expense.

SUMMARY OF THE INVENTION

The object of the present invention is to provide a device for dumping, with which a larger area can be filled in a cost-effective and safe manner.

The dumping system according to the present invention has a conveyor belt. This conveyor belt consists of belt modules, which are suspended on cables. A traveling tripper, which can travel in the direction of conveying, is arranged on the belt modules.

Advantageously, it is thus possible to span over the area to be filled (for example, a pit) with cables and to dump material by means of the traveling tripper at all points of the bracing. Thus, it is not necessary to drive the dumped material. Costly stabilization measures or even the draining of the material to be dumped may thus be eliminated.

Preferably, carrier cables are braced over the area to be filled. To these (carrier cables) are fastened suspension cables, which are connected with the belt modules and hold the belt modules in a mostly horizontal alignment. The belt modules are shaped, such that they can carry the conveyor belt and the traveling tripper and yet have a light-weight design. The individual belt modules are elongated structures that are resistant to bending and are flexibly connected with one another, so that they can be adapted to the slack of the carrier cables without compulsive forces. The position of the traveling tripper and the working load on the conveyor belt have an effect in this case.

The slack of the carrier cables is preferably compensated by a different length of the suspension cables. Thus, the belt modules are aligned mostly horizontally. Advantageously, the carrier cables therefore do not have to absorb very high tensile forces in order to achieve a slack that is as low as possible.

Furthermore, the carrier cables are preferably fastened to outer supports. The outer supports in this case are, for example, arranged on the slope, or even behind it in case of an unstable slope. Furthermore, the outer supports are preferably braced via pulling elements, such as cables or tie rods. The pulling elements are, for example, connected with ground anchors.

The outer supports are particularly preferably designed as hinged supports. I.e., the outer supports have a joint at their foot, such that they only have to absorb forces of pressure. Advantageously, the outer supports are thus not stressed to bending, and compulsive forces are avoided in the system.

Furthermore, at least one intermediate support, which is, furthermore, preferably likewise designed as a hinged support and on which the carrier cables lie, can advantageously be arranged between the outer supports. Advantageously, the thickness of the carrier cables and hence also the system weight can be kept within limits. Furthermore, the at least one intermediate support preferably stands on a pile in order to limit its length and thus also the pendulum length.

Furthermore, four carrier cables are preferably provided. In this case, the two middle carrier cables lie directly next to one another and the two outer carrier cables are arranged spaced apart from the middle carrier cables. The suspension cables connect an outer carrier cable each and the adjacent middle carrier cables with the side of the belt modules lying under them. Thus, the suspension cables leading to the left side of the belt modules are fastened to the left of the two middle carrier cables and correspondingly the suspension cables leading to the right side of the belt modules are fastened to the right of the two middle carrier cables. Advantageously, this results in a triangular-shaped belt suspension, which absorbs wind loads and reduces a lateral swinging. Furthermore, only one cable thickness is advantageously needed for the carrier cables.

As an alternative, three carrier cables are provided, whereby the outer two carrier cables are arranged spaced apart from the middle carrier cable. In this case as well, the suspension cables connect each outer carrier cable and the middle carrier cable with the side of the belt modules lying under them, which results in a triangular-shaped belt suspension. In this design, the middle carrier cable has to be designed as thicker because of its higher load.

Furthermore, the distance of the outer carrier cables from the middle carrier cable or carrier cables is preferably greater in areas with long suspension cables than in areas with shorter suspension cables. Advantageously, weight can thus be saved, the susceptibility to cross winds increases with the length of the suspension cables and thus a triangle with greater base side is advantageous.

Furthermore, the carrier cables are preferably kept spaced apart by means of connecting rods. In this case, one connecting rod can connect the two outer carrier cables, one outer carrier cable with a middle carrier cable or even the outer carrier cables with the middle cables. Thus, the stability can be further increased.

A traveling tripper, which can dump the material to be dumped at any site, is arranged traveling on the longitudinal girders of the belt modules. For this purpose, the upper belt is raised. The material to be dumped is dumped at the front pulley and preferably led downwards by the belt module via a saddle chute on both sides.

Furthermore, the traveling tripper can be moved by means of a capstan system with two cables. Advantageously, the traveling tripper thus does not have to have its own driving means, does not need current feed and has a lower weight.

Furthermore, catwalks are preferably provided on one or both sides next to the belt modules for the personnel for maintenance and inspection operations. Furthermore, such catwalks are preferably also provided at the traveling tripper, whereby a ladder may additionally be present for bridging across the height of the traveling tripper.

Also, the belt modules preferably have high longitudinal girders, between which the upper belt of the conveyor belt is arranged. A good protection against wind is consequently guaranteed.

Furthermore, the traveling tripper preferably has a saddle chute, onto which the material is dumped by the conveyor belt and which distributes this [material] on both sides of the belt modules. Furthermore, a spraying device, for example, a water-misting means is preferably arranged in the vicinity of the dumping point for the suppression of dust.

It appears to be useful for wide areas to be filled, when the dumping system is shifted laterally. For this purpose, the outer supports and the intermediate supports are preferably designed as traveling transversely to the direction of the carrier cables.

Furthermore, the traveling ability is preferably guaranteed by rail chassis with track panels, crawlers or another chassis. The selection of the concrete chassis is made depending on external conditions, in particular the composition of the ground as well as on the necessary traveling length.

The dumping system is then shifted by shifting the outer supports and intermediate supports carried out simultaneously or piece by piece one after the other.

Furthermore, the subject of the present invention is a process for shifting the dumping system. The dumping system has for this purpose a front pulling element and a rear pulling element as viewed in the direction of shifting. The process comprises the following steps: In a first step a), the length of the front pulling element is shortened and at the same time the rear pulling element is lengthened. Consequently, the outer support is moved in the direction of shifting. This is carried out until the front pulling element and the carrier cable are aligned mostly flush. The step is preferably carried out at the same time for both outer supports.

Then, in a second step b) the rear pulling element is placed in front of the front pulling element. The distance in this case corresponds to the distance before. Thus, the formerly rear pulling element becomes the front pulling element and the formerly front pulling element is the rear pulling element.

In a last step c), analogously to step a), the length of the now front pulling element (still the rear pulling element in step a)) is shortened and at the same time the now rear pulling element (still the front pulling element in step a)) is lengthened until the outer support is arranged in the middle between the pulling elements.

The pulling elements are preferably cables with cable winches. As an alternative, pulling elements with constant length in combination with hydraulic cylinders or spindles may also be used.

The intermediate supports are advantageously pulled along, moved by their own drives, or pulled by mobile machines.

Furthermore, the outer supports can preferably travel on rails, whereby after the shifting, the rail segments behind the chassis are placed in front of same.

Two exemplary embodiments of the present invention are explained below on the basis of figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
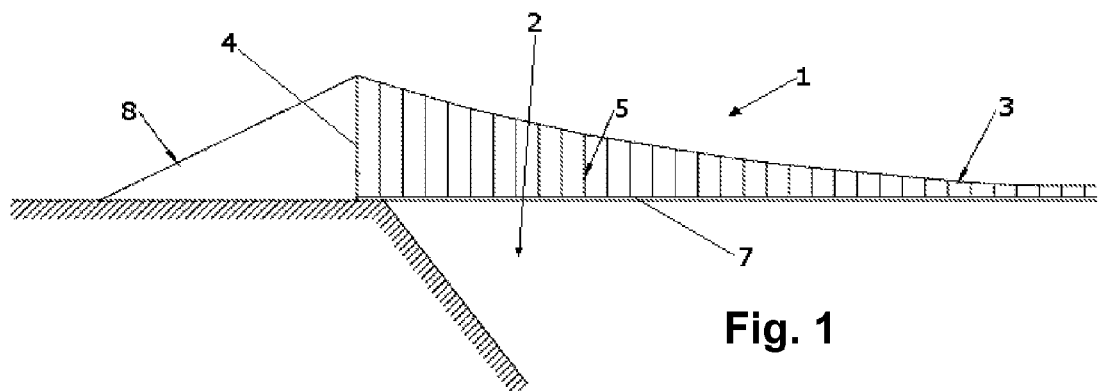
FIG. 1 is a side view of a dumping system according to the present invention.

Referring to the drawings, FIG. 1 shows a dumping system 1, which bridges over a very deep, old strip mine 2 and must not be moved during the entire operation time. Only half of the dumping system 1 is shown for reasons of representability.

Outer supports 4 are arranged on the slope of the old strip mine 2. Four carrier cables 3 are fastened to the outer supports 4 as a part of a cable arrangement. The outer supports 4 are, in addition, braced by four bracing cables 8 each, which directly pass on the longitudinal forces of the carrier cables 3. The bracing cables 8 are fastened in the ground via ground anchors 81. Belt modules 7 are suspended on the carrier cables 3 on the outside at a greater distance.

Figure 2:
FIG. 2 is a top view of the dumping system.

FIG. 2 shows a top view of the dumping system 1. The four carrier cables 3, two of which lie in the middle next to one another, are recognizable. The two other carrier cables 3 are arranged on the outside at a greater distance.

The system has a span of 780 m and four carrier cables 3 with a diameter of 100 mm. The carrier cables 3 have a slack of approximately 60 m in the middle, the height of the outer supports is approximately 68 m and the bracing distance (i.e., the distance from outer supports to the ground anchor) is approximately 136 m. The outer supports 4 are designed as hinged supports and have a width of approximately 26 m at the top.

The distance between the carrier cables 3 is fixed by means of connecting rods in the area of the carrier cables 3, in which the suspension cables 5 are fastened. Thus, the belt modules 7 are also held by a stable triangular suspension in case of a great length of the suspension cables 5.

Figure 3:
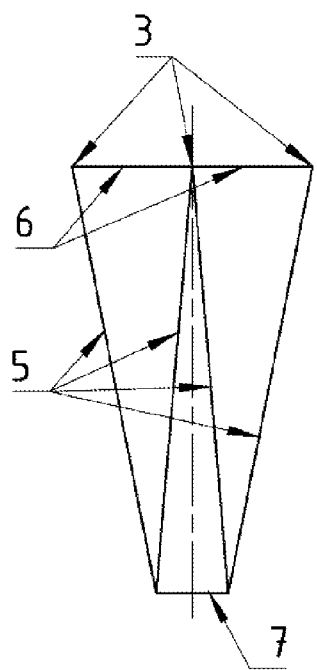
FIG. 3 is a view of the triangular suspension.

FIG. 3 shows a sectional view, in which the triangular suspension is readily recognizable. One suspension cable 5 each leads from the outer carrier cables 3 and from the adjacent middle carrier cables 3 to the outer side of the belt module 7 lying under them. The distance between the outer carrier cables 3 is fixed by means of a connecting rod 6 in the area, in which the suspension cables 5 are fastened to the carrier cables 3.

Because of the slack of the carrier cables 3, the length of the suspension cables 5 is reduced towards the middle. The distances of the carrier cables 3 between one another are also reduced there. With the connecting rods 6 and suspension cables 5, a weight reduction is advantageously achieved.

Figure 4:
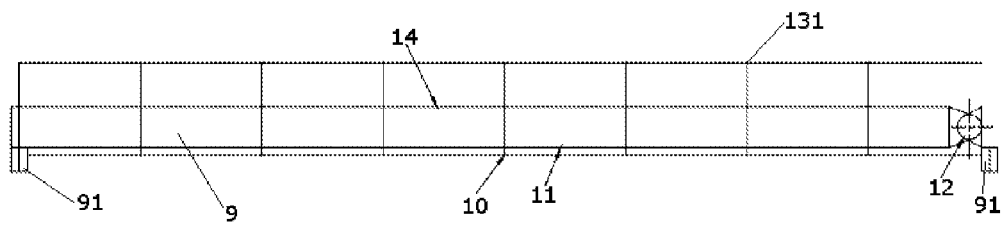
FIG. 4 is a side view of a belt module.
Figure 5:
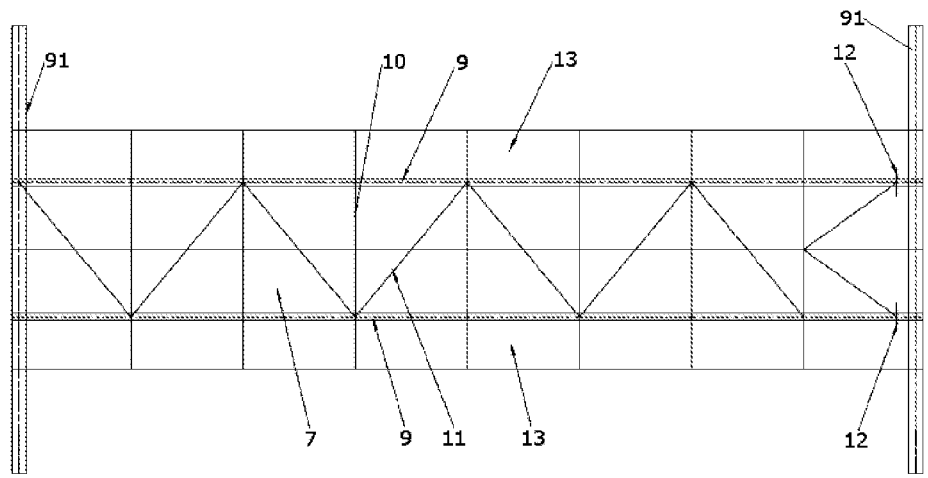
FIG. 5 is a top view of a belt module.
Figure 6:
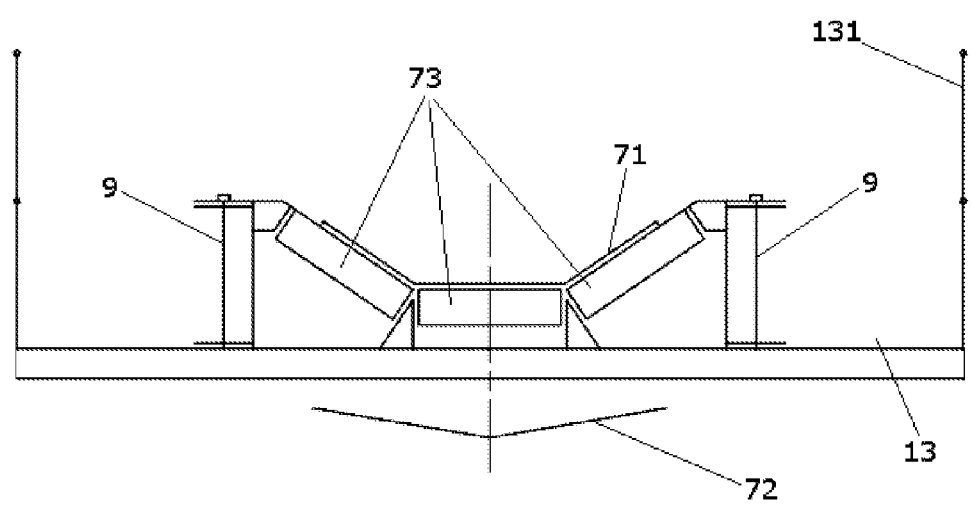
FIG. 6 is a sectional view of a belt module.

FIG. 4 shows the lateral view, FIG. 5 shows a top view and FIG. 6 shows a sectional view of a belt module 7. In FIG. 5, the representation of the conveyor belt was eliminated for the visibility of the girders. The conveyor belt has an upper belt 71, which is mounted on idler rollers 73, and a lower belt 72.

Each belt module 7 has a length of 12 m. For fastening with the suspension cables 5, the belt module 7 has a wide crossbeam 91 and two longitudinal girders 9 at a distance of the system width of the conveyor belt.

Crossbeams 10 and diagonal girders 11 are arranged under the longitudinal girders 9. The upper belt 71, of the conveyor belt unit with support by means of idler rollers 73, lies protected against the wind between the high longitudinal girders 9. The lower belt 72 lies under the girders.

The belt modules 7 are connected with one another by means of bolts 12 in the vicinity of the wide crossbeams 91. They may consequently follow the changes in slack of the carrier cables 3 without compulsive forces.

Catwalks 13 with handrails 131, from which the conveyor belt can be checked and maintained, are arranged on the outside at the longitudinal girders 9 of the belt modules 7.

Figure 7:
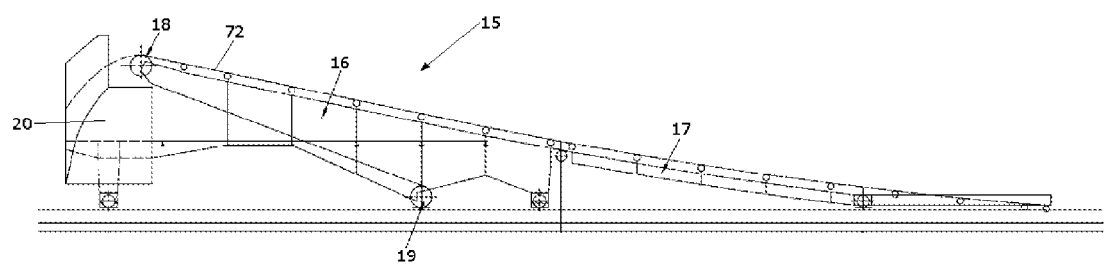
FIG. 7 is a side view of the traveling tripper.
Figure 8:
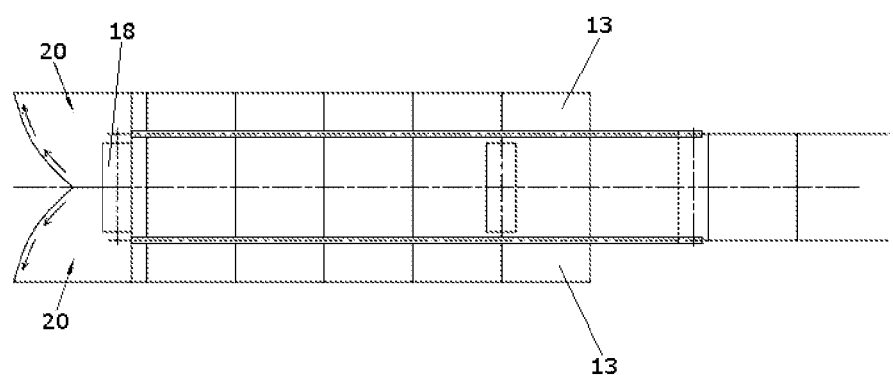
FIG. 8 is a top view of the traveling tripper.

Square bars 14 are welded as rails onto the longitudinal girders 9 of the belt modules 7. The traveling tripper 15 shown in FIGS. 7 and 8 can travel on these rails 14.

The traveling tripper 15 has a supporting structure 16, a belt intake 17, a discharge pulley 18 and a tail pulley 19. The upper belt 71 with the material to be dumped is raised up to the discharge pulley 18. There, the material is dumped and falls onto a saddle chute 20, which is arranged in a roof-like manner over the conveyor belt unit and the catwalks 13. The material falls downwards on both sides of the saddle chute 20.

The traveling tripper 15 is moved and held in position by means of two cables with capstan drive. It does not, therefore, need traveling mechanisms and does not have to be supplied with current.

If the dumping system is to dump the material not only in a strip, but in one area, then the dumping system has to be shifted from time to time at right angles to the belt system. In this case, it must be ensured that no compulsive forces develop. The exemplary embodiment described below makes possible a right-angle shifting.

Figure 9:
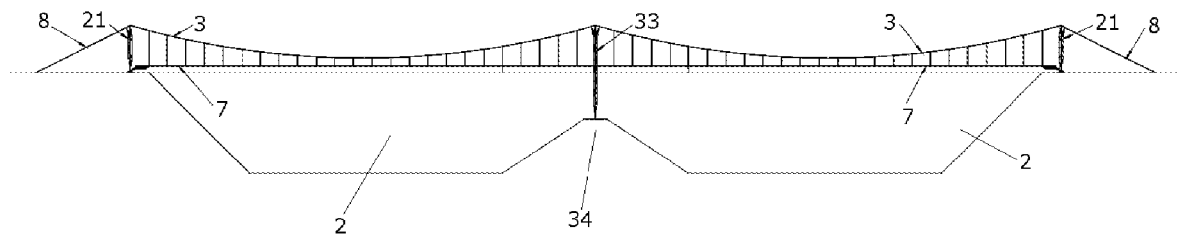
FIG. 9 is a side view of a shiftable dumping system.

FIG. 9 shows a side view of a shiftable dumping system.

In principle, the dumping system corresponds to the one described above. However, it is provided additionally with a middle support 33, which is also designed as a pendulum support. Moreover, the outer supports 21 and the middle support 33 can travel supported by means of rail chassis and track panels. In order to reduce the height of the middle support 33, the middle support 33 is arranged on a pile 34.

Figure 10:
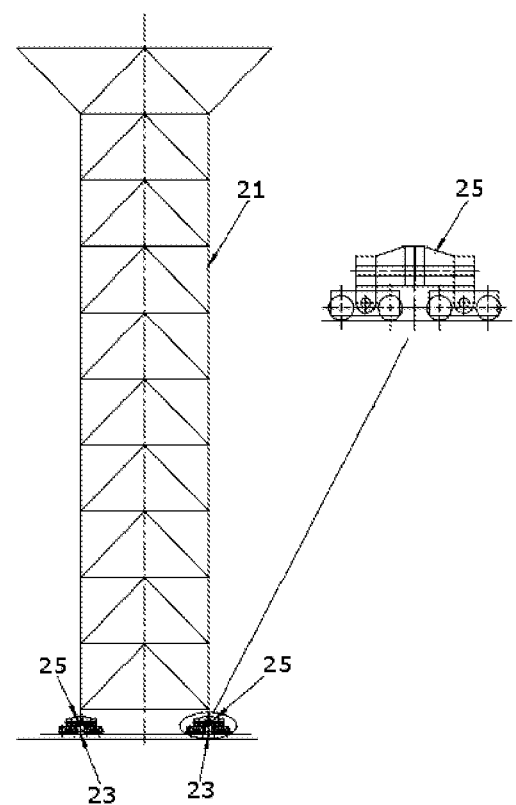
FIG. 10 is a view in the direction of conveying of the outer support.
Figure 11:
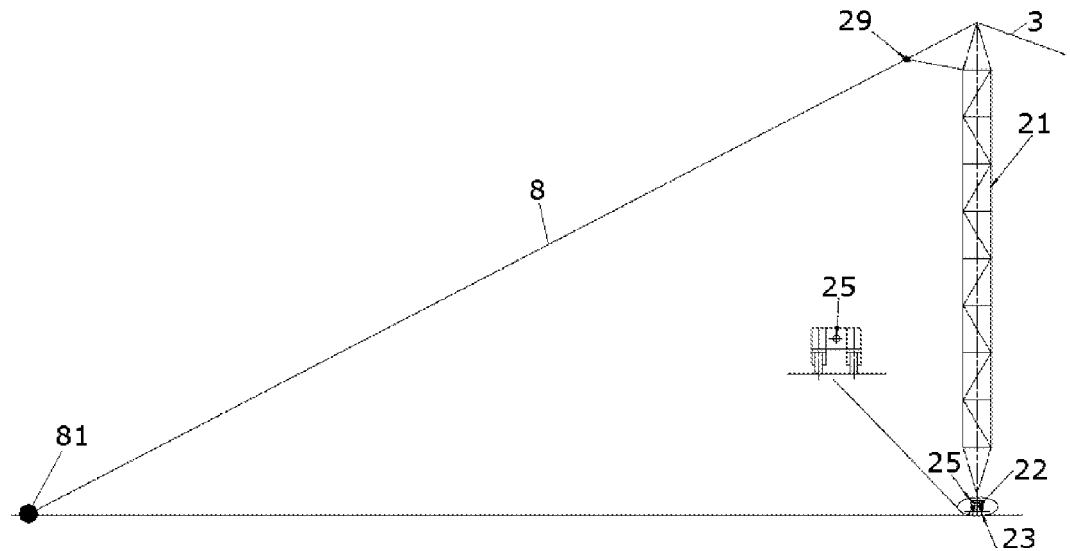
FIG. 11 is a side view of the outer support.
Figure 12:
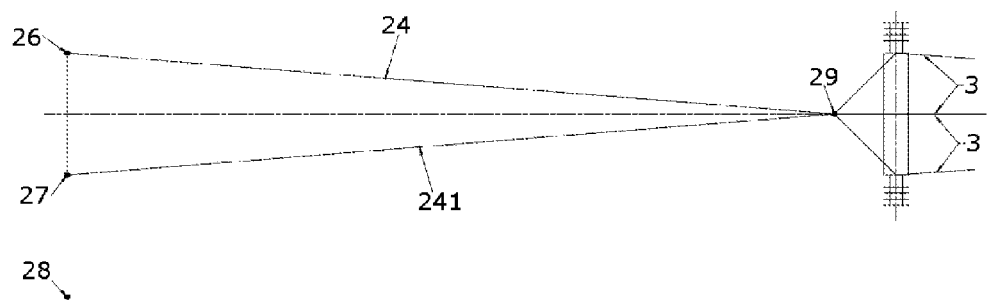
FIG. 12 is a top view of the outer support before the shifting.

As shown in FIGS. 10 and 11, the outer support 21 stands on two sets of chassis 25, which are carried over rails 23. The chassis 25 is designed as a double rail chassis, and the outer support 21 is connected with same via a pendulum axle 22. The pendulum axle 22 lies parallel to the direction of travel of the chassis 25.

At the top at the outer support 21, the forces of the four carrier cables 3 are brought together onto a junction point 29 and passed on to the anchoring points 26 and 27 via two large cable winches 24 and 241. In normal operation, the dumping system stands exactly between the two anchoring points 26, 27. Each cable winch 24, 241 thus bears half of the tensile force of the carrier cables 3.

The distance between the anchoring points 26 and 27 corresponds to the moving range.

The shifting takes place with an empty conveyor belt, which reduces the cable forces to approximately 75%.

During the moving, the outer support 21 is not moved forwards by traveling mechanisms, because compulsive forces may arise in this case. The propulsion takes place in that the cable length is lengthened by means of the cable winch 24 and at the same time the cable length is shortened by means of the cable winch 24. Consequently, a force component develops in the direction of travel. During this process, the force of the cable winch 24 increases more and more and the force of the cable winch 24 decreases. If the dumping system has reached the height of the anchoring point 27, the cable winch 24 absorbs the entire bracing force. The cable winch 24 is then detached from the anchoring point 26 in a load-free manner and connected with the new anchoring point 28 on the other side in a load-free manner.

The process described above is then repeated with the new anchoring points 27 and 28.

The middle support 33 is automatically pulled along by shifting the two outer supports 21.

While specific embodiments of the invention have been shown and described in detail to illustrate the application of the principles of the invention, it will be understood that the invention may be embodied otherwise without departing from such principles.

APPENDIX

| List of Reference Numbers: | |
|---|---|
| 1 | Dumping system |
| 2 | Old strip mine |
| 3 | Carrier cable |
| 4 | Outer supports |
| 5 | Suspension cables |
| 6 | Connecting rods |
| 7 | Belt modules |
| 71 | Conveyor belt/Upper belt |
| 72 | Conveyor belt/Lower belt |
| 73 | Idler rollers |
| 8 | Bracing cable |
| 81 | Ground anchor |
| 9 | Longitudinal girder |
| 91 | Wide crossbeam |
| 10 | Crossbeam |
| 11 | Diagonal girder |
| 12 | Bolt |
| 13 | Catwalk |
| 131 | Handrail |
| 14 | Rail |
| 15 | Traveling tripper |
| 16 | Supporting structure |
| 17 | Belt intake |
| 18 | Discharge pulley |
| 19 | Tail pulley |
| 20 | Saddle chute |
| 21 | Outer support |
| 22 | Pendulum axle |
| 23 | Rails |
| 24 | Cable winch |
| 241 | Cable winch |
| 25 | Chassis |
| 26 | Anchoring point |
| 27 | Anchoring point |
| 28 | New anchoring point |
| 29 | Junction point |
| 30 | Pile |
| 33 | Intermediate support |
| 34 | Pile |

What is claimed is:

1. A dumping system comprising:
   a conveyor belt with belt modules;
   a cable arrangement with cables, the conveyor belt with belt modules being suspended on cables of the cable arrangement, the cable arrangement with cables comprising braced carrier cables that hold the belt modules in a mostly horizontal alignment via suspension cables, the cable arrangement comprising four carrier cables, whereby middle carrier cables are arranged directly next to one another and outer carrier cables are arranged spaced apart from the middle carrier cable;
   suspension cables connecting each outer carrier cable and the adjacent middle carrier cable with a side of the belt modules lying under the outer carrier cable and the adjacent middle carrier cable, which results in a triangular-shaped belt suspension; and
   a traveling tripper arranged traveling in the direction of conveying of the conveyor belt, the traveling tripper traveling on the belt modules.

2. A dumping system in accordance with claim 1, wherein a slack of the carrier cables is compensated by a variation of length of the suspension cables such that the belt modules are aligned mostly horizontally.

3. A dumping system in accordance with claim 2, wherein the outer supports are linked flexibly as a hinged support, such that they absorb only forces of pressure.

4. A dumping system in accordance with claim 1, wherein the carrier cables are fastened to outer supports, which are braced via pulling elements comprising at least one of cables and tie rods.

5. A dumping system in accordance with claim 4, further comprising an additional intermediate support arranged between the outer supports, wherein the additional intermediate support comprises a hinged support, to which the carrier cables are fastened.

6. A dumping system in accordance with claim 1, wherein a distance of the outer carrier cables from the middle carrier cable or cables in areas with long suspension cables is wider than in areas with shorter suspension cables.

7. A dumping system in accordance with claim 1, wherein the carrier cables are kept spaced apart by means of connecting rods.

8. A dumping system in accordance with claim 1, wherein catwalks are provided on at least one side of the belt modules for personnel for maintenance and inspection operations.

9. A dumping system in accordance with claim 1, wherein:
   the belt modules comprise high longitudinal girders; and
   the conveyor belt is arranged between the high longitudinal girders of the belt modules.

10. A dumping system in accordance with claim 1, wherein:
    the traveling tripper travels on the belt modules;
    each of the belt modules comprise longitudinal girders, each of said belt modules being connected to an adjacent one of the belt modules by a flexible connection; and
    the conveyor belt is arranged between the longitudinal girders of the belt modules.

11. A dumping system in accordance with claim 10, wherein:
    the flexible connection is arranged at longitudinal ends of the longitudinal girders and connects adjacent longitudinal girders of the adjacent belt modules.

12. A process for the shifting of a dumping system, the process comprising the steps of:
    providing a dumping system comprising a conveyor belt with belt modules, a cable arrangement with cables, the conveyor belt with belt modules being suspended on cables of the cable arrangement and a traveling tripper arranged traveling in the direction of conveying of the conveyor belt, wherein the cable arrangement with cables comprises braced carrier cables that hold the belt modules in a mostly horizontal alignment via suspension cables and the traveling tripper travels on the belt modules;
    providing a front pulling element and a rear pulling element, as viewed in the direction of shifting;
    shortening a length of the front pulling element and at the same time lengthening the rear pulling element until the front pulling element and the belt modules are in flush alignment;
    moving the rear pulling element in front of the front pulling element and at a same distance from the front pulling element, such that a formerly rear pulling element is the front pulling element and the formerly rear pulling element is the front pulling element; and
    shortening a length of the front pulling element and at the same time lengthening the rear pulling element until the new desired position is reached.

13. A process in accordance with claim 12, wherein the pulling elements are reeved cables and the shortening and lengthening of the cables is carried out by means of cable winches.

14. A process in accordance with claim 12, wherein at least the outer supports or the outer supports and an intermediate support can travel on rail-type chassis and rail segments are moved from the area behind the respective support into an area in front of the respective support after each portion of shifting.

15. A dumping system comprising:
    a conveyor belt with belt modules;
    a cable arrangement with cables, the conveyor belt with belt modules being suspended on cables of the cable arrangement, the cable arrangement with cables comprising braced carrier cables that hold the belt modules in a mostly horizontal alignment via suspension cables;
    a traveling tripper arranged traveling in the direction of conveying of the conveyor belt, the traveling tripper traveling on the belt modules;
    outer supports, the carrier cables being fastened to the outer supports, which are braced via pulling elements comprising at least one of cables and tie rods;
    an additional intermediate support arranged between the outer supports, the outer supports and intermediate supports being designed with traveling means for traveling transversely to the carrier cable direction.

16. A dumping system in accordance with claim 15, wherein the traveling means comprises at least one of a rail-type chassis, crawler-type chassis or other chassis.

17. A dumping system comprising:
    a conveyor belt with belt modules;
    a cable arrangement with cables, the conveyor belt with belt modules being suspended on cables of the cable arrangement, the cable arrangement with cables comprising braced carrier cables that hold the belt modules in a mostly horizontal alignment via suspension cables, the cable arrangement comprising three carrier cables with outer carrier cables arranged spaced apart from a middle carrier cable, the suspension cables connecting each outer carrier cable and the middle carrier cable with the side of the belt modules lying under them, which results in a triangular-shaped belt suspension;

a traveling tripper arranged traveling in the direction of conveying of the conveyor belt, the traveling tripper traveling on the belt modules.

18. A dumping system in accordance with claim 17, wherein the carrier cables are kept spaced apart by means of connecting rods.

19. A dumping system comprising:
a conveyor belt with belt modules;
a cable arrangement with cables, the conveyor belt with belt modules being suspended on cables of the cable arrangement, the cable arrangement with cables comprising braced carrier cables that hold the belt modules in a mostly horizontal alignment via suspension cables;
a traveling tripper arranged traveling in the direction of conveying of the conveyor belt, the traveling tripper traveling on the belt modules;
a capstan system comprising two cables wherein the traveling tripper is moved by means of the capstan system with the two cables.

20. A dumping system comprising:
a conveyor belt with belt modules;
first and second supports arranged spaced from each other by a distance;
a cable arrangement with cables, the conveyor belt with belt modules being suspended on cables of the cable arrangement, the cable arrangement including carrier cables connected to the first and second supports, the carrier cables spanning the distance, the cable arrangement including suspension cables extending from the carrier cables to the belt modules, the belt modules being supported through the suspension cables, the carrier cables and the supports;
a traveling tripper arranged traveling in the direction of conveying of the conveyor belt.

21. A dumping system in accordance with claim 20, wherein:
each of the belt modules comprise longitudinal girders, each of said belt modules being connected to an adjacent one of the belt modules by a flexible connection about a bolt, the flexible connection being arranged at longitudinal ends of the longitudinal girders and connects adjacent longitudinal girders of the adjacent belt modules.

\* \* \* \* \*